United States Patent
Piercy et al.

(10) Patent No.: US 8,139,750 B1
(45) Date of Patent: Mar. 20, 2012

(54) EARLY MEDIA SERVICE CONTROL

(75) Inventors: Larry H. Piercy, St. Joseph, MO (US);
Trey A. Hilyard, Olathe, KS (US); Alex A. Zhang, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1605 days.

(21) Appl. No.: 11/467,594

(22) Filed: Aug. 28, 2006

(51) Int. Cl.
*H04M 7/00* (2006.01)

(52) U.S. Cl. ............. 379/230; 379/221.08; 379/221.09; 379/221.1; 379/221.11; 379/221.12

(58) Field of Classification Search .................. 370/352, 370/353, 354, 401, 395.3, 465, 466; 379/201
See application file for complete search history.

(56) References Cited

U.S. PATENT DOCUMENTS

| | | | | |
|---|---|---|---|---|
| 6,023,474 | A * | 2/2000 | Gardner et al. | 370/467 |
| 6,483,837 | B1 * | 11/2002 | Howell et al. | 370/395.3 |
| 7,450,563 | B2 * | 11/2008 | Cook et al. | 370/352 |
| 2002/0080777 | A1 * | 6/2002 | Gaiser et al. | 370/352 |
| 2003/0076820 | A1 * | 4/2003 | Hoffmann | 370/356 |
| 2004/0120494 | A1 * | 6/2004 | Jiang et al. | 379/210.01 |
| 2005/0105706 | A1 * | 5/2005 | Kokkinen | 379/201.01 |
| 2007/0291776 | A1 * | 12/2007 | Kenrick et al. | 370/401 |

OTHER PUBLICATIONS

Rosenberg et al, RFC 3261, Network Working Group, Jun. 2002, all pages.*

* cited by examiner

*Primary Examiner* — Joseph J Nguyen

(57) ABSTRACT

A method of operating a communication network comprises receiving a call setup request from a calling party in a calling network to a called party in the communication network wherein the call requires an early media service provided by a service network to the called party, forwarding the call setup request to the service network wherein the service network returns a first call setup response in response to the call setup request, and generating a second call setup response and transmitting the second call setup response to the calling network wherein the calling network generates and transmits a call setup instruction to the calling party in response to the second call setup request.

10 Claims, 5 Drawing Sheets

EARLY MEDIA SERVICE CONTROL

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the field of telecommunications, and in particular, to call signaling and processing for early media service control.

2. Description of the Prior Art

Telecommunication carriers often times provide early media services to their customers. An early media service is a service that is provided early in the call provisioning process. For example, custom call tones are considered early media. In the case of custom call tones, a calling party dials a called party. Rather than apply a standard call tone to the calling party, such as a ring, a carrier applies a custom call tone, such as a song. The custom call tone is typically selected by the called party as part of a subscription service.

In some early media situations, early media is provided by a third-party provider and a one-way backward call path must be cut through from the third party through the terminating switch to the calling party. In such a case, a calling party goes off-hook and dials the called party. A switch in the originating network generates and transmits an initial address message (IAM) to the terminating network indicating the calling party and the called party. The terminating network recognizes that the call requires early media. Responsively, the terminating network generates and transmits an IAM to a third-party provider. The terminating network simultaneously rings the called party.

Typically, the third-party provider returns an address complete message (ACM) in response to the IAM from the terminating network. The ACM triggers the terminating network to transmit the ACM to the originating network. The ACM causes the one-way backward call path to be cut through from the third-party provider to the calling party. Once the one-way backward call path is open, the third-party provider plays out the early media.

Eventually, the called party answers the call by going off-hook. The off-hook triggers the terminating network to switch connections from the third-party provider to the called party. Additionally, the terminating network signals the originating network to open a two-way bearer path between the calling party and the called party.

Recently, Voice Over Internet Protocol (VOIP) service has increased in popularity. Several signaling protocols, such as the session initiation protocol (SIP) and H.323, are used to support VOIP service. In contrast with circuit-switched networks, most VOIP networks do not apply call tones to calling parties. Rather, call tones are generated and played out locally to the caller by the calling device in response to a signaling message from a central call processing system, such as a soft-switch. In one example, a SIP 180 message triggers a calling device to play-out a ring call tone.

In the prior art, it was recognized that VOIP service must support early media services. In response, the SIP 183 message was designed to trigger a calling device to listen for early media on a port and play-out the early media to the caller.

Often times, VOIP networks interface with circuit-switched networks, such as the public switched telephone network (PSTN). Under such circumstances, interfaces exist to interface between SS7 signaling and VOIP signaling, such as SIP or H.323. Most SS7 signaling messages can be directly interfaced to counter-part SIP messages. For example, a SS7 ACM message is typically mapped to a SIP 180 message. As discussed above, a SIP 180 message triggers the calling device to play-out a locally generated call tone.

More particularly, in order to trigger a SIP 180 message, a SS7 ACM message must be formatted in a manner that maps to the SIP 180 message. For example, a SS7 ACM indicating a Called Party Status of FREE triggers a SIP 180 message.

Likewise, a SS7 ACM message must be formatted in a different manner that maps to a SIP 183 message in order to trigger the generation and transmission of an SIP 183 message to a calling device. For example, a SS7 ACM with the Called Party Status set to NO INDICATION will trigger a SIP 183 message in the VOIP network. This is necessary to provide early media services to VOIP callers that place calls to called parties in SS7 networks.

In an example of successfully provisioning an early media service between a SS7 network and a VOIP network, a VOIP caller sends a SIP INVITE message to a soft-switch. The soft-switch responsively transmits an IAM to a switch in the SS7 network. The switch in the SS7 network responsively forwards the IAM to a third-party early media provider while simultaneously ringing the called party. In response to the IAM, the third-party provider returns an ACM with the Called Party Status set to NO INDICATION. The switch receives and forwards the ACM to the soft-switch, thereby cutting a one-way backward call path to the VOIP network. The soft-switch receives the ACM, responsively maps the ACM to a SIP 183 message, and transmits the SIP 183 message to the calling device. The SIP 183 message instructs the calling device to listen on a specified port for the early media.

Unfortunately, the ACM generated and transmitted by the third-party service provider is not always formatted correctly. For instance, it is a common problem that the third-party service provider formats the ACM with the Called Party Status set to FREE, thereby triggering a SIP 180 message in the VOIP network, rather than a SIP 183 message. Similar problems exist with respect to other third-party services that the signaling generated by the third-party service incorrectly impacts downstream service processes. It is typically too expensive and difficult for a carrier to request third-party service providers to change the signaling that incorrectly impacts downstream service processes.

SUMMARY OF THE INVENTION

An embodiment of the invention advances the art by providing methods, systems, and software that allow a primary service provider to provide customers with access to third-party provided services, but without the vulnerability created by reliance upon the signaling of third-party service providers. In particular, embodiments of the invention allows a communication network to respond to signaling from an originating network independent of later signaling that is generated by a third-party service network.

In an embodiment of the invention, a method of operating a communication network comprises receiving a call setup request from a calling party in a calling network to a called party in the communication network wherein the call requires an early media service provided by a service network to the called party, forwarding the call setup request to the service network wherein the service network returns a first call setup response in response to the call setup request, and generating a second call setup response and transmitting the second call setup response to the calling network wherein the calling network generates and transmits a call setup instruction to the calling party in response to the second call setup request.

In an embodiment of the invention, the method comprises transmitting the second call setup response to the calling network prior to forwarding the call setup request to the service network.

In an embodiment of the invention, the method comprises transmitting the second call setup response to the calling network before the service network returns the first call setup response.

In an embodiment of the invention, the call setup request comprises a signaling system 7 (SS7) initial address message (IAM).

In an embodiment of the invention, the first call setup response comprises a first SS7 address complete message (ACM) and wherein a backward call indicator (BCI) field of the first SS7 ACM indicates a first parameter.

In an embodiment of the invention, the second call setup response comprises a second SS7 ACM and wherein a BCI field of the second SS7 ACM indicates a second parameter having a value different than a value of the second parameter.

In an embodiment of the invention, the call setup instruction comprises a session initiation protocol (SIP) 183 message.

In an embodiment of the invention, a call processing system for handling a call in a communication network comprises an interface configured to receive a call setup request from a calling party in a calling network to a called party in the communication network wherein the call requires an early media service provided by a service network to the called party, forward the call setup request to the service network wherein the service network returns a first call setup response in response to the call setup request, and transmit a second call setup response to the calling network wherein the calling network generates and transmits a call setup instruction to the calling party in response to the second call setup request. The call processing system further comprises a processing system configured to process the call setup request to generate the second call setup response.

In an embodiment of the invention, a software product for handling a call in a communication network comprises software operational when executed by a call processing system to direct the call processing system to receive a call setup request from a calling party in a calling network to a called party in the communication network wherein the call requires an early media service provided by a service network to the called party, forward the call setup request to the service network wherein the service network returns a first call setup response in response to the call setup request, transmit a second call setup response to the calling network wherein the calling network generates and transmits a call setup instruction to the calling party in response to the second call setup request, and process the call setup request to generate the second call setup response. The software product further comprises a storage medium configured to store the software.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 1:
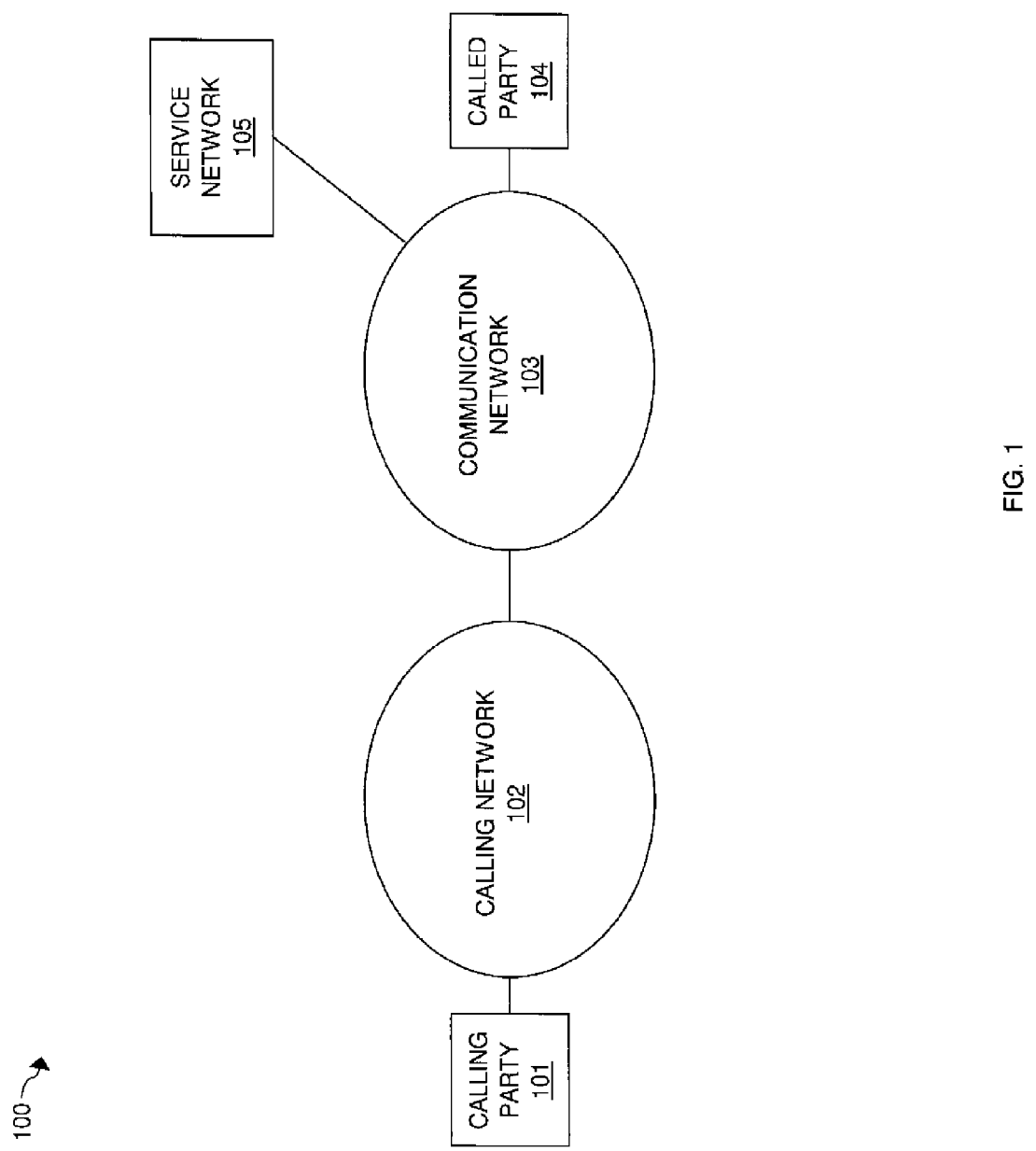
FIG. 1 illustrates a communication network in an embodiment of the invention.

FIG. 1 illustrates an embodiment of the invention whereby a call is initiated by a caller to a called party that subscribes to an early media service, such as custom call tones. An originating network communicates with a terminating network via call signaling to establish the call to the called party in the terminating network. The terminating network recognizes that the call requires an early media service and signals a third-party service provider for the early media service. Rather than rely upon the signaling that will be returned by the third-party service provider, the terminating network returns early signaling to the originating network in order to open a back-ward call path over which the early media will eventually be played.

In FIG. 1, communication network 100 includes calling party 101, calling network 102, communication network 103, called party 104, and service network 105. Calling party 101 is operatively coupled to calling network 102. Calling network 102 is operatively coupled to communication network 103. Communication network is operatively coupled to service network 105 and called party 104.

Figure 2:
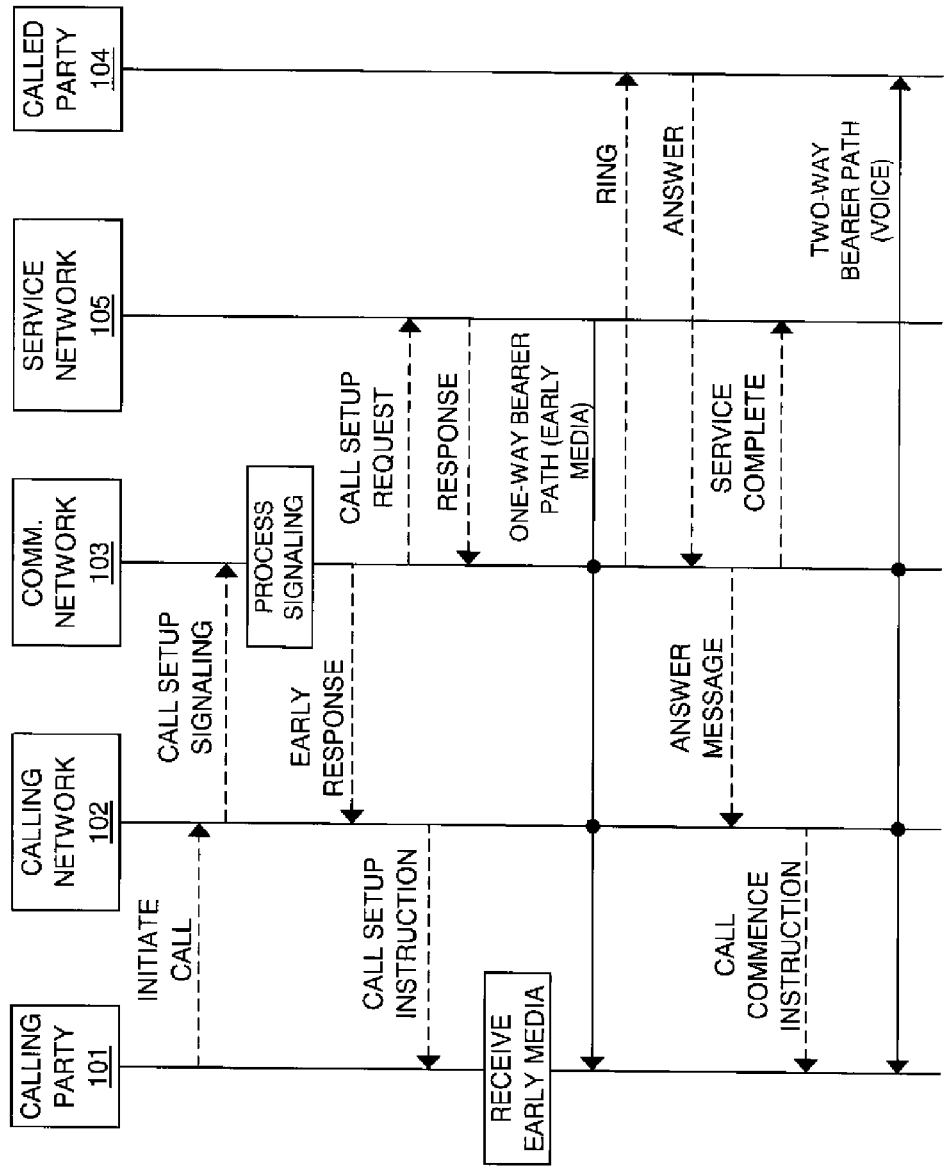
FIG. 2 illustrates the operation of a communication network in an embodiment of the invention.

FIG. 2 illustrates a call flow diagram in an embodiment of the invention describing a call flow whereby a call requiring an early media service is placed from calling party 101 to called party 104.

To begin, calling party 101 initiates a call to calling network 102. Calling network 102 receives and processes the call setup request to determine a destination network for the call. In this example, communication network 103 is the terminating network. Calling network 102 generates and transmits a call setup request or signaling to communication network 103.

Communication network 103 receives the call setup request and forwards the call request to service network 105 for the early media service. Service network 105 responsively returns a setup response to communication network 103.

In the interim between forwarding the call setup request to service network 105 and receiving the setup response from service network 105, communication network 103 generates and transmits an early call setup response to calling network 102. Calling network 102 generates and transmits a call setup instruction to calling party 101 in response to the early call setup response.

In one embodiment, communication network 103 transmits the early call setup response to the calling network prior to forwarding the call setup request to service network 105. In another embodiment, communication network 103 transmits the early call setup response to calling network 102 before service network 105 returns the call setup response.

Advantageously, communication network 100 allows a communications service provider to by-pass or pre-empt signaling generated and transmitted by a third-party service provider. In this manner, signaling that is formatted by the third-party service provider can be avoided. In addition, the expenses typically incurred when dealing with third-party service providers can be reduced or avoided entirely.

Second Embodiment Configuration and Operation

Figure 3:
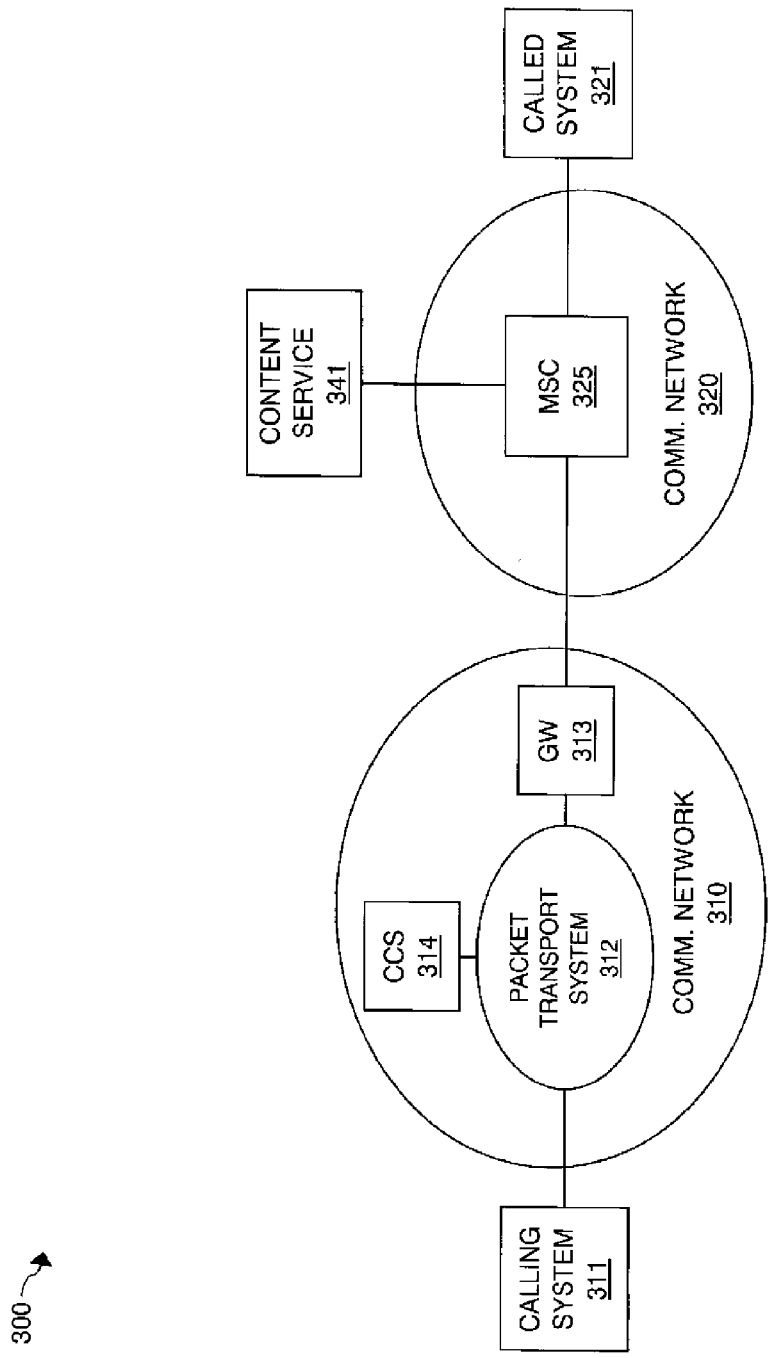
FIG. 3 illustrates a communication network in an embodiment of the invention.

FIG. 3 illustrates an embodiment of the invention whereby a call is initiated by a caller to a called party that subscribes to an early media service, such as custom call tones. An originating network communicates with a terminating network via call signaling to establish the call to the called party in the terminating network. The terminating network recognizes that the call requires an early media service and signals a third-party service provider for the early media service. Rather than rely upon the signaling that will be returned by the third-party service provider, the terminating network returns early signaling to the originating network in order to open a back-ward call path over which the early media will eventually be played.

In FIG. 3, communication network 300 includes communication network 310 and communication network 320. Communication network 320 includes mobile switching center (MSC) 325. Communication network 300 further includes called system 321. Called system 321 could be any system capable of placing calls to or receiving calls from communication network 320.

Communication network 310 could be a packet communication network, such as a Voice over Internet Protocol (VOIP) network. In such an example, communication network 310 could support call control protocols such as the session initiation protocol (SIP) or H.323. Communication network 320 could be a carrier grade wireless network. For example, communication network 320 could support code division multiple access (CDMA) communications, or any variation of CDMA communications such as CDMA 2000. Additionally, communication network 320 could support wireless time division multiple access (TDMA), Global System for Mobile communications (GSM), or 802.16 (WiMAX) communications, as well as other types of carrier grade wireless communications. It should be understood that communication networks 310 and 320 could each represent distinct communication networks, but that actual physical overlap, overlay, or other such layered interconnection is possible and well known in the art.

Communication network 310 includes packet transport system 312, call control system (CCS) 314, and gateway 313. Communication network 300 further includes calling system 311. Calling system 311 could be any VOIP, SIP, or H.323 enabled system capable of communicating with communication network 310. Calling system 11 could be, for example, a phone, pager, computer, or the like. Packet transport system 312 could be any system, network, or collection of systems or networks capable of routing, switching, or otherwise handling or transporting packet communications. CCS 314 could be any system capable of controlling calls to or from calling system 311. For example, CCS 314 could be a media gateway controller, a soft switch, a proxy server, or any variation or combination thereof. Gateway 313 could be any system capable of interfacing communications between packet transport system 312 and communication network 320. Gateway 313 could be capable of interworking bearer communications, signaling communications, or both, between packet transport system 312 and communication network 320.

Communication network 300 also includes content service 341. Content service 341 could be any service or system capable of providing a content service to communication network 320. For example, content service 341 could provide a call tone service to communication network 320. Content service 341 could be provided by a third-party owner or operator, separate and distinct from the owner or operator of communication network 320.

Figure 4:
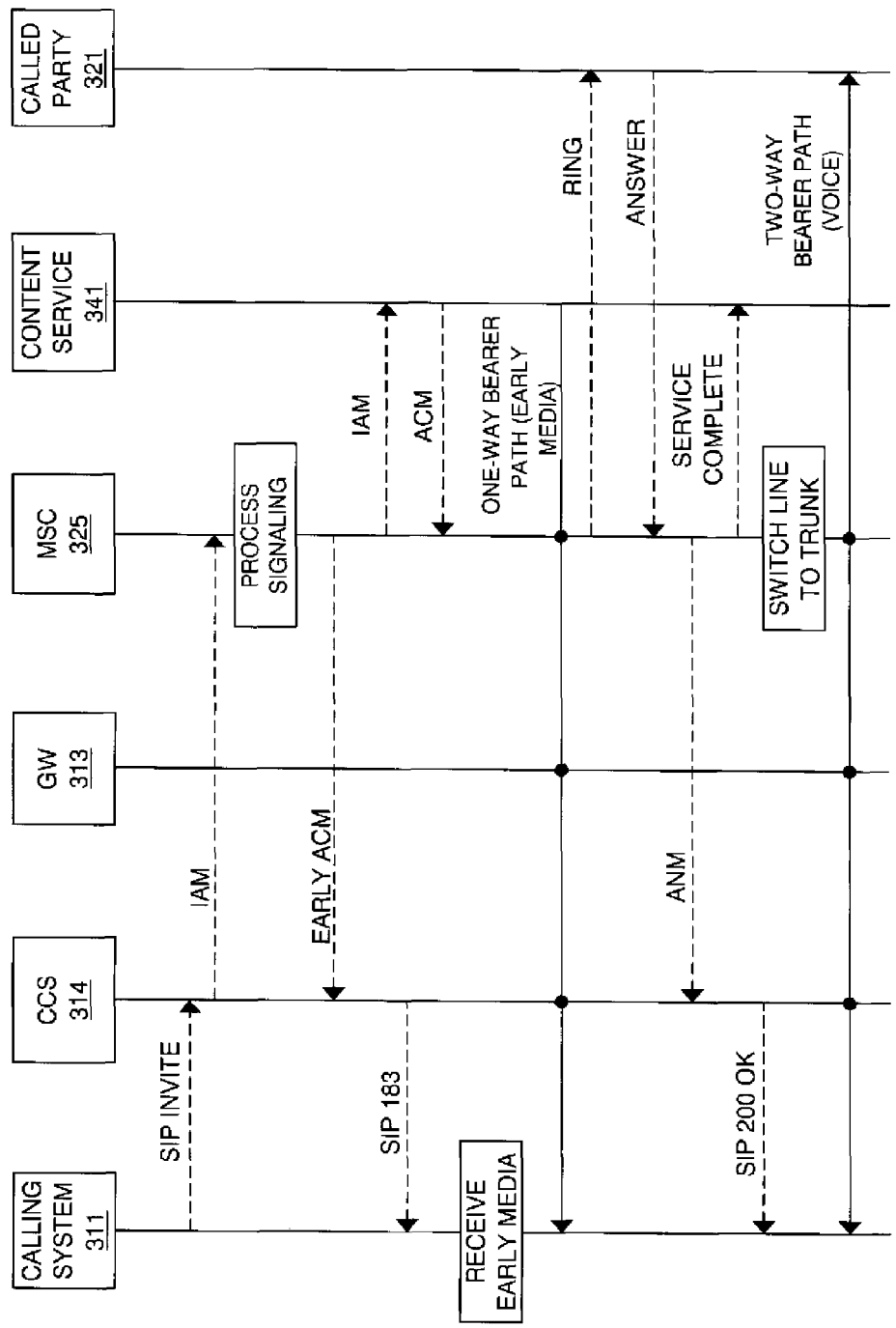
FIG. 4 illustrates the operation of a communication network in an embodiment of the invention.

FIG. 4 is a call flow diagram in an embodiment of the invention describing the typical operation of communication network 300 in an example whereby a call is placed from calling system 311 to called system 321 and a call tone service is provided on the call by content service 341.

To begin, a caller operating calling system 311 initiates a call. For instance, the user could press a key pad to input a telephone number and initiate the call. In an example, the user could dial a ten digit telephone number in accordance with the North American Dialing Plan. In another example, the user could select a called party from a list. Other variations are possible.

In response to the user input, calling system 311 transmits a call signaling message to CCS 314. In an example, the call setup message could be a SIP INVITE message. In most cases, the call signaling message could indicate the calling party and the called party, such as by their respective telephone numbers or other such identifiers.

CCS 314 receives the call signaling message from calling system 311 and processes the message to setup the call. As part of the call setup process, CCS 314 could interface with MSC 325 to extend the call from communication network 310 to communication network 320. In order to do so, CCS 314 typically selects an outgoing connection on gateway 313 to MSC 325 for the call. CCS 314 then generates and transmits a SS7 IAM to MSC 325. The IAM could identify the called party and the incoming connection over which the call will be connected between gateway 313 and MSC 325. CCS 314 could also provide control signaling to gateway 313 and calling system 311 to effectuate the transfer of packet communications over packet transport system 312. For instance, CCS 314 could provide gateway 313 with the network address of calling system 311. Likewise, CCS 314 could provide calling system 311 with the address of a port on gateway 313 for the call. Such control is well known in the art and variations are possible.

MSC 325 receives the IAM and processes the IAM to handle the call. As part of the call setup process, MSC 325 could process the identity of the called party to determine whether or not an early media service is required on the call. For instance, MSC 325 could query a database using the telephone number of the called party included in the IAM to make such a determination.

If an early media service is required on the call, MSC 325 generates and transmits an early address complete message (ACM) to CCS 314. The early ACM serves to establish a one-way backward call path from MSC 325 to communication network 310. CCS 314 receives the early ACM and responsively directs calling system 314 to listen for one-way bearer communications from communication network 320. In one example, CCS 314 could transmit a SIP 183 message to calling system 311. Calling system 311 could receive the one-way bearer communications and play-out the communications in an audible manner for the calling party.

After transmitting the early ACM to CCS 314, MSC 325 forwards or transmits the IAM to content service 341. Again, the IAM could indicate the called party. Content service replies to the IAM with a standard ACM. MSC 325 receives the ACM and responsively opens a port associated with a connection to content service 341. Content service 341 processes the IAM to determine the specific early media to provide on behalf of the called party. Upon making such a determination, content service plays out the early media over the selected connection between content service 341 and MSC 325.

MSC 325 connects the connection incoming from content service 341 to the connection outgoing to gateway 313 established for the call. The early media is transported over the various connections from content service 341 to gateway 313, and then over packet transport system 312 to calling system 311. Calling system 311 receives and plays out the early media for the caller.

It should be understood that MSC 325 could receive the initial IAM from CCS 314 and process the IAM to determine whether or not the call requires an early media service. For example, MSC 325 could process the called telephone number indicated in the IAM against a translations table stored in a translations database. The translations table could direct a signaling interface of MSC 325 to generate and transmit the early ACM. In an alternative embodiment, the translations table could direct MSC 325 to first route the call internally to a silent tone card. Routing the call internally to the silent tone card could cause the MSC 325 to generate and transmit the early ACM. The early ACM could cause a one-way backward call path to be burned through to calling party 101. The silent tone card could then play-out a "silent" tone. Upon receiving the later ACM from content service 341, MSC 325 could switch the call over to content service 341 from the silent tone card.

It should be further understood that, in one example, the backward call indicator (BCI) field of the early SS7 ACM could indicate a first parameter, while the BCI field of the later SS7 ACM sent by content service 341 could indicate a second parameter having a value different than a value of the second parameter. For example, the first parameter could be set to NO INDICATION, while the second parameter could be set to FREE.

While the early media service is provided by content service 341, MSC 325 determines the availability of called party 321 and attempts to ring or alert the called party of the call.

Eventually, the called party could answer the call, thereby creating an answer event. MSC 325 could detect the answer event and responsively switch the call over to the connection servicing called party 321 via a wireless transceiver station from the connection connecting MSC 325 to content service 341. MSC 325 could signal to content service 341 that the service is complete and could also signal to CCS 314 that the call has been answered.

In response to the call answer, CCS 314 could signal calling system 311 that the call has been answered and that two-way bearer communications can commence. In an example, CCS 314 could transmit a SIP 200 message to calling system 311.

Advantageously, communication network 300 allows a communications service provider to by-pass or pre-empt signaling generated and transmitted by a third-party service provider. In this manner, signaling that is formatted by the third-party service provider can be avoided. In addition, the expenses typically incurred when dealing with third-party service providers can be reduced or avoided entirely.

Call Processing System

Figure 5:
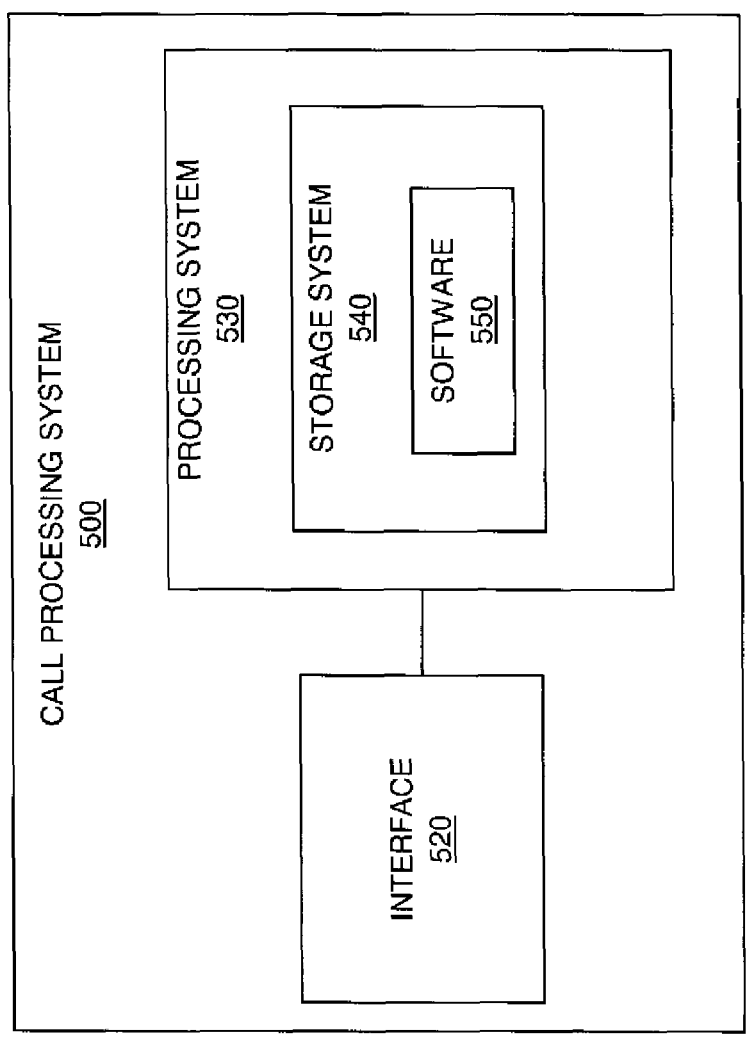
FIG. 5 illustrates a call processing system in an embodiment of the invention.

FIG. 5 illustrates call processing system 500 in an embodiment of the invention. Call processing system 500 includes interface 520, processing system 530, storage system 540, and software 550. Storage system 540 stores software 550. Processing system 530 is linked to interface 520. Call processing system 500 could be comprised of a programmed general-purpose computer, although those skilled in the art will appreciate that programmable or special purpose circuitry and equipment may be used. Call processing system 500 may use a client server architecture where operations are distributed among a server system and client devices that together comprise elements 520-550.

Interface 520 could comprise a network interface card, modem, port, or some other communication device. Interface 520 may be distributed among multiple communication devices. Interface 530 could comprise a computer microprocessor, logic circuit, or some other processing device. Processing system 530 may be distributed among multiple processing devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a general-purpose computer. Software 550 could also comprise an application program, firmware, or some other form of machine-readable processing instructions. When executed by the processing system 530, software 550 directs processing system 530 to operate as described for communication network 100 and MSC 325, as well as for other elements of communication networks 100 and 300.

What is claimed is:

1. A method of operating a call processing system in a communication network, the method comprising:
    receiving a call setup request for a call from a calling party in a calling network to a called party in the communication network;
    processing the call setup request to determine if the call requires an early media service that is selected by the called party prior to the call and provided by a service network to the calling party;
    forwarding the call setup request to the service network if the early media service is required, wherein the service network returns a SS7 address complete message (ACM) having a backward call indicator (BCI) field that indicates a first parameter in response to the call setup request; and
    generating an early SS7 ACM having a BCI field that indicates a second parameter having a value different than a value of the first parameter in the call processing system if the early media service is required, and transmitting the early SS7 ACM to the calling network prior to receiving the SS7 ACM, wherein the calling network generates and transmits a call setup instruction to the calling party in response to the early SS7 ACM.

2. The method of claim 1 comprising transmitting the early SS7 ACM to the calling network prior to forwarding the call setup request to the service network.

3. The method of claim 2 wherein the call setup instruction comprises a session initiation protocol (SIP) 183 message.

4. The method of claim 1 wherein the early SS7 ACM serves to establish a one-way backward communication path from the service network to the calling party over which the early media service is played.

5. The method of claim 1 wherein the call setup request comprises a signaling system 7 (SS7) initial address message (IAM).

6. A call processing system for handling a call in a communication network, the call processing system comprising:
an interface configured to receive a call setup request for a call from a calling party in a calling network to a called party in the communication network, forward the call setup request to a service network if an early media service is required, wherein the service network returns a SS7 address complete message (ACM) having a backward call indicator (BCI) field that indicates a first parameter in response to the call setup request, and transmit an early SS7 ACM having a BCI field that indicates a second parameter having a value different than a value of the first parameter to the calling network prior to receiving the SS7 ACM to establish a one-way backward communication path from the service network to the calling party over which the early media service is played, wherein the calling network generates and transmits a call setup instruction to the calling party in response to the early SS7 ACM; and
a processing system configured to process the call setup request to determine if the call requires the early media service that is selected by the called party prior to the call and provided by the service network to the calling party, and to generate the early SS7 ACM if the early media service is required.

7. The call processing system of claim 6 wherein the interface is configured to transmit the early SS7 ACM to the calling network prior to forwarding the call setup request to the service network.

8. The call processing system of claim 7 wherein the call setup instruction comprises a session initiation protocol (SIP) 183 message.

9. The call processing system of claim 6 wherein the call setup request comprises a signaling system 7 (SS7) initial address message (IAM).

10. A non-transitory computer readable medium having program instructions stored thereon for operating a call processing system in a communication network that, when executed by the call processing system, direct the call processing system to:
receive a call setup request at the call processing system for a call from a calling party in a calling network to a called party in the communication network;
process the call setup request to determine if the call requires an early media service that is selected by the called party prior to the call and provided by a service network to the calling party;
forward the call setup request to the service network if the early media service is required, wherein the service network returns a SS7 address complete message (ACM) having a backward call indicator (BCI) field that indicates a first parameter in response to the call setup request; and
transmit an early SS7 ACM having a BCI field that indicates a second parameter having a value different than a value of the first parameter to the calling network prior to receiving the SS7 ACM, wherein the calling network generates and transmits a call setup instruction to the calling party in response to the early SS7 ACM; and
process the call setup request to generate the early SS7 ACM if the early media service is required.

* * * * *